US012561811B2

(12) United States Patent
Wei

(10) Patent No.: US 12,561,811 B2
(45) Date of Patent: Feb. 24, 2026

(54) METHOD AND APPARATUS OF NIDUS SEGMENTATION, ELECTRONIC DEVICE, AND STORAGE MEDIUM

(71) Applicant: SHANGHAI UNITED IMAGING HEALTHCARE CO., LTD., Shanghai (CN)

(72) Inventor: Yuan Wei, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 424 days.

(21) Appl. No.: 18/217,394

(22) Filed: Jun. 30, 2023

(65) Prior Publication Data

US 2024/0005510 A1 Jan. 4, 2024

(30) Foreign Application Priority Data

Jun. 30, 2022 (CN) .......................... 202210770789.3

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/10072* (2013.01); *G06T 2207/30101* (2013.01)

(58) Field of Classification Search
None
See application file for complete search history.

(56) References Cited

U.S. PATENT DOCUMENTS

| | | | | |
|---|---|---|---|---|
| 10,430,949 | B1 | 10/2019 | Wang et al. | |
| 2021/0390703 | A1* | 12/2021 | Nie ............................ | G06T 7/11 |
| 2023/0177677 | A1* | 6/2023 | Yuan .......................... | G06T 7/60 |
| | | | | 382/128 |

FOREIGN PATENT DOCUMENTS

| | | | | |
|---|---|---|---|---|
| CN | 109584169 A | 4/2019 | | |
| CN | 110060263 A | * 7/2019 | ............. | G06N 3/084 |
| CN | 110517264 A | * 11/2019 | .......... | G06T 7/0012 |
| CN | 110652312 A | 1/2020 | | |
| CN | 113177928 A | 7/2021 | | |
| CN | 113223015 A | 8/2021 | | |
| CN | 113298831 A | 8/2021 | | |

(Continued)

OTHER PUBLICATIONS

English translation of CN-110060263-A. (Year: 2019).*

(Continued)

*Primary Examiner* — Thomas D Lee

(57) ABSTRACT

A method of nidus segmentation includes: acquiring a medical image to be processed; performing a vessel segmentation on the medical image to be processed to obtain a first vessel segmentation result; extracting a first centerline of a first vessel according to the first vessel segmentation result; cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and obtaining a nidus segmentation result based on the first object medical image and the first object vessel segmentation result.

20 Claims, 6 Drawing Sheets

(56)         References Cited

FOREIGN PATENT DOCUMENTS

| CN | 113628193 | A |   | 11/2021 |   |   |
|----|-----------|---|---|---------|---|---|
| CN | 113902693 | A |   | 1/2022  |   |   |
| CN | 113902741 | A |   | 1/2022  |   |   |
| CN | 113989293 | A | * | 1/2022  | ............. | G06N 3/045 |

OTHER PUBLICATIONS

English translation of CN-110517264-A. (Year: 2019).*
English translation of CN-113989293-A. (Year: 2022).*
Chinese office action (CN Application No. 2022107707893) , dated Mar. 19, 2025, 10 pages.
Chinese Notice of Allowance (Application No. 2022107707893) , dated Sep. 18, 2025, 3 pages.

* cited by examiner

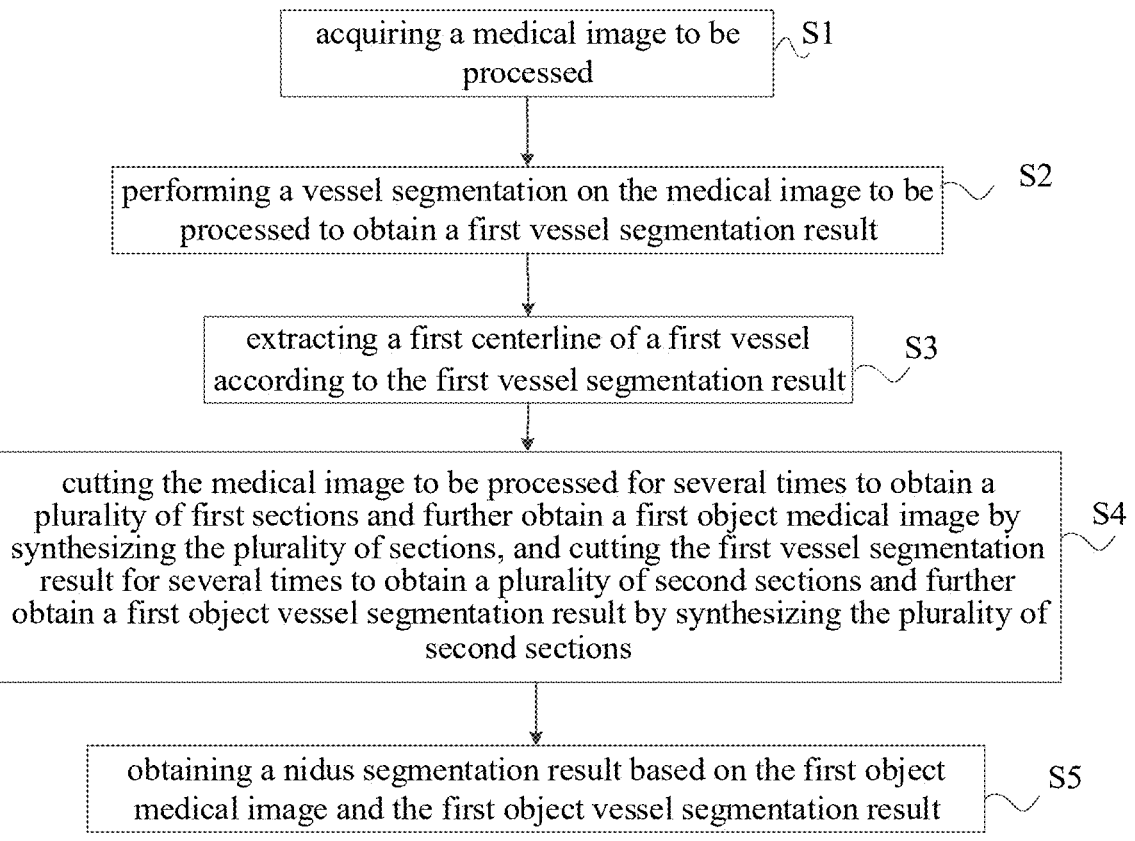

| acquiring a medical image to be processed | S1 | performing a vessel segmentation on the medical image to be processed to obtain a first vessel segmentation result    S2 extracting a first centerline of a first vessel according to the first vessel segmentation result    S3 cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections    S4 obtaining a nidus segmentation result based on the first object medical image and the first object vessel segmentation result    S5

FIG. 1

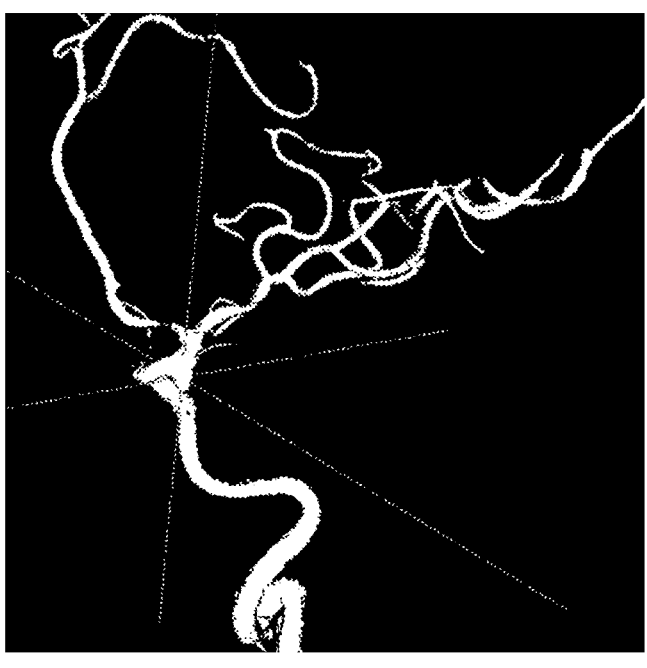

FIG. 2

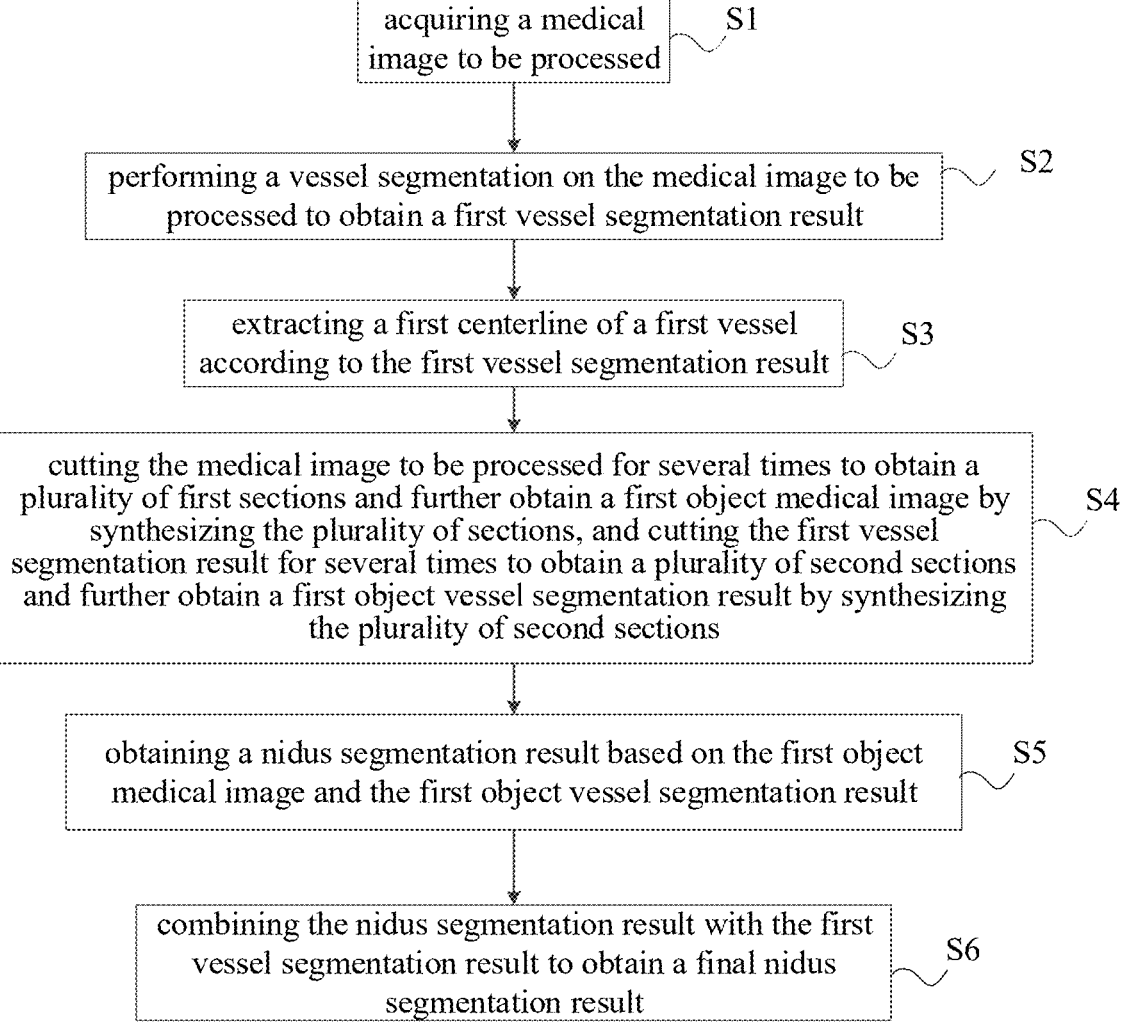

acquiring a medical image to be processed ~ S1 performing a vessel segmentation on the medical image to be processed to obtain a first vessel segmentation result ~ S2 extracting a first centerline of a first vessel according to the first vessel segmentation result ~ S3 cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections ~ S4 obtaining a nidus segmentation result based on the first object medical image and the first object vessel segmentation result ~ S5 combining the nidus segmentation result with the first vessel segmentation result to obtain a final nidus segmentation result ~ S6

METHOD AND APPARATUS OF NIDUS SEGMENTATION, ELECTRONIC DEVICE, AND STORAGE MEDIUM

CROSS-REFERENCE TO RELATED APPLICATION

The present application claims the priority of Chinese Patent Application No. 202210770789.3, filed on Jun. 30, 2022, entitled "Method and Apparatus of Nidus Segmentation, Electronic Device, And Storage Medium", which is hereby incorporated by reference in its entirety.

TECHNICAL FIELD

The present disclosure relates to the field of image processing technology, and more particularly, to a method and an apparatus of nidus segmentation, an electronic device, and a storage medium.

BACKGROUND

Intracranial aneurysm is a local swelling of intracranial vessels caused by a vascular endothelial injury, and the morbidity rate is about 5% to 8% for the adult population. Subarachnoid hemorrhage (SAH) caused by rupture of intracranial aneurysms is one of the important causes of hemorrhagic stroke and has extremely high disability and mortality rates. The rupture of an intracranial aneurysm is highly correlated with morphological parameters (e.g., aneurysmal neck, a maximum diameter, etc.) of the intracranial aneurysm. Currently, the diagnosis of intracranial aneurysms is mainly performed by means of imaging methods such as CT Angiography (CTA), Magnetic Resonance Angiography (MRA), Digital Subtraction Angiography (DSA), Digital Radiography (DR), etc. Then, based on priori knowledge of a doctor, an aneurysm nidus region is manually delineated or drawn to obtain an aneurysm nidus mask, so that the morphological parameters of the aneurysm may be measured. This method is not only time-consuming and labor-consuming, but also causes an inaccurate segmentation which may easily lead to erroneous measurements of the morphological parameters of the aneurysms. With the improvement of people's living standard and the development of imaging technology, a large number of image data to be detected and diagnosed are accumulated clinically, and a clinical auxiliary diagnosis method is urgently needed to improve the accuracy and efficiency of segmenting the nidus of intracranial aneurysm.

Object detection and image segmentation methods based on deep learning methods have been widely used for detecting and segmenting niduses in medical images, such as a detection of a pulmonary nodule and a segmentation of heart chambers. However, due to a small size of the intracranial aneurysm, the proportion of an object foreground and a background is extremely unbalanced, which brings a challenge to the task of the nidus segmentation based on the deep learning method. In addition, the intracranial aneurysms have various shapes and have characteristics similar to the parent arteries, resulting in greatly reduced accuracy of the nidus area segmentation.

SUMMARY

A first aspect of the present disclosure provides a method of nidus segmentation, including:

acquiring a medical image to be processed;

performing a vessel segmentation on the medical image to be processed to obtain a first vessel segmentation result;

extracting a first centerline of a first vessel according to the first vessel segmentation result;

cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and obtaining a nidus segmentation result based on the first object medical image and the first object vessel segmentation result.

In some embodiments, the obtaining the nidus segmentation result based on the first object medical image and the first object vessel segmentation result includes inputting the first object medical image and the first object vessel segmentation result into a nidus segmentation model to perform a nidus segmentation, and obtaining a nidus segmentation result.

In some embodiments, the extracting the first centerline of the first vessel according to the first vessel segmentation result includes:

extracting the first centerline of the first vessel according to positions of at least two points in response to the at least two points selected in the first vessel segmentation result.

In some embodiments, the cutting the medical image to be processed for several times includes cutting the medical image to be processed along directions perpendicular to the first centerline for several times, and the cutting the first vessel segmentation result for several times includes cutting the first vessel segmentation result along the directions perpendicular to the first centerline for several times.

In some embodiments, the cutting the medical image to be processed along the directions perpendicular to the first centerline for several times to obtain the plurality of first sections includes: cutting the medical image to be processed for several times along the directions perpendicular to the first centerline by a first step length to obtain the plurality of first sections.

In some embodiments, the cutting the first vessel segmentation result along the directions perpendicular to the first centerline for several times to obtain the plurality of second sections includes: cutting the first vessel segmentation result for several times along the directions perpendicular to the first centerline by a second step length to obtain the plurality of second sections.

In some embodiments, the inputting the first object medical image and the first object vessel segmentation result into the nidus segmentation model includes:

selecting an object point based on a position of nidus as believed; extracting a first image block of a predetermined size centered on the object point from the first object medical image, and extracting a second image block of the predetermined size centered on the object point from the first object vessel segmentation result; inputting the first image block and the second image block into the nidus segmentation model.

In some embodiments, after the inputting the first object medical image and the first object vessel segmentation result into the nidus segmentation model to perform the nidus segmentation and obtaining the nidus segmentation result, the method further includes:

combining the nidus segmentation result with the first vessel segmentation result to obtain a final nidus segmentation result.

In some embodiments, the nidus segmentation model is trained according to sample data including sample medical images, second object medical images, second object vessel segmentation results corresponding to the second object medical images, and nidus labeling results obtained by labeling niduses in the second object vessel segmentation results.

In some embodiments, the obtaining the second object medical images and the second object vessel segmentation results includes:

performing a vessel segmentation on an acquired sample medical image to obtain a second vessel segmentation result;

extracting a second centerline of a second vessel according to the second vessel segmentation result; and cutting the sample medical image along directions perpendicular to the second centerline for several times to obtain a plurality of third sections and further obtain the second object medical image by synthesizing the plurality of third sections, and cutting the second vessel segmentation result along directions perpendicular to the second centerline for several times to obtain a plurality of fourth sections and further obtain the second object vessel segmentation result by synthesizing the plurality of fourth sections.

A second aspect of the present disclosure provides a system of nidus segmentation, including: at least one non-transitory storage medium comprising a set of instructions for a nidus segmentation, and at least one processor in communication with the at least one non-transitory storage medium, wherein when executing the set of instructions, the at least one processor is configured to cause the system to perform operations including: acquiring a medical image to be processed; performing a vessel segmentation on the medical image to be processed to obtain a first vessel segmentation result; extracting a first centerline of the first vessel according to the first vessel segmentation result; cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and obtaining a nidus segmentation result based on the first object medical image and the first object vessel segmentation result.

In some embodiment, the cutting the medical image to be processed for several times includes cutting the medical image to be processed along directions perpendicular to the first centerline for several times, and the cutting the first vessel segmentation result for several times comprises cutting the first vessel segmentation result along the directions perpendicular to the first centerline for several times.

In some embodiments, the obtaining the nidus segmentation result based on the first object medical image and the first object vessel segmentation result includes: inputting the first object medical image and the first object vessel segmentation result into a nidus segmentation model to perform the nidus segmentation, and obtaining the nidus segmentation result.

In some embodiments, the at least one processor is configured to cause the system to perform operations further comprising combining the nidus segmentation result with the first vessel segmentation result to obtain a final nidus segmentation result.

In some embodiments, the extracting the first centerline of the first vessel according to the first vessel segmentation result comprises extracting the first centerline of the first vessel according to positions of at least two points in response to the at least two points selected in the first vessel segmentation result.

A third aspect of the present disclosure provides an apparatus of nidus segmentation, including: an image acquisition module, a vessel segmentation module, a centerline extraction module, an image cutting module, and a nidus segmentation module.

The image acquisition module is configured to acquire a medical image to be processed.

The vessel segmentation module is configured to perform a vessel segmentation on the medical image to be processed to obtain a first vessel segmentation result.

The centerline extraction module is configured to extract a first centerline of the first vessel according to the first vessel segmentation result.

The image cutting module is configured to cut the medical image to be processed for several times to obtain a plurality of first sections and further obtain a first object medical image by synthesizing the plurality of sections, and configured to cut the first vessel segmentation result for several times to obtain a plurality of second sections and further obtain a first object vessel segmentation result by synthesizing the plurality of second sections.

In some embodiments, the image cutting module is specifically configured to cut the medical image to be processed along directions perpendicular to the first centerline for several times to obtain the plurality of first sections, and configured to cut the first vessel segmentation result along the directions perpendicular to the first centerline for several times to obtain the plurality of second sections.

In some embodiments, the nidus segmentation module is specifically configured to input the first object medical image and the first object vessel segmentation result into a nidus segmentation model to perform a nidus segmentation, and obtain a nidus segmentation result.

In some embodiments, the apparatus of nidus segmentation further includes a result combining module, configured to combine the nidus segmentation result with the first vessel segmentation result to obtain a final nidus segmentation result.

In some embodiments, the centerline extraction module is specifically configured to extract the first centerline of the first vessel according to positions of at least two points in response to the at least two points selected in the first vessel segmentation result.

In some embodiments, the image cutting module is specifically configured to cut the medical image to be processed for several times along directions perpendicular to the first centerline by a first step length to obtain the plurality of first sections.

In some embodiments, the image cutting module is specifically configured to cut the first vessel segmentation result for several times along directions perpendicular to the first centerline by a second step length to obtain the plurality of second sections.

In some embodiments, the nidus segmentation module is specifically configured to, in response to a selected object point in the first vessel segmentation result, extract image blocks of a predetermined size centered on the selected object point from the first object medical image and the first object vessel segmentation result, respectively, and input two extracted image blocks into the nidus segmentation model.

In some embodiments, the nidus segmentation model is trained according to sample data including sample medical images, second object medical images, second object vessel segmentation results corresponding to the second object medical images, and nidus labeling results obtained by labeling niduses in the second object vessel segmentation results.

In some embodiments, the apparatus of nidus segmentation further includes a sample acquisition module including a vessel segmentation unit, a centerline extraction unit, and an image cutting unit.

The vessel segmentation unit is configured to perform a vessel segmentation on an acquired sample medical image to obtain a second vessel segmentation result.

The centerline extraction unit is configured to extract a second centerline of a second vessel according to the second vessel segmentation result.

The image cutting unit is configured to cut the sample medical image along directions perpendicular to the second centerline for several times to obtain a plurality of third sections and further obtain the second object medical image by synthesizing the plurality of third sections, and configured to cut the second vessel segmentation result along directions perpendicular to the second centerline for several times to obtain a plurality of fourth sections and further obtain the second object vessel segmentation result by synthesizing the plurality of fourth sections.

A fourth aspect of the present disclosure provides an electronic device, including a memory and a processor. A computer program is stored on the memory, and the processor, when executing the computer program, performs the method of nidus segmentation of the first aspect.

A fifth aspect of the present disclosure provides a non-transitory computer readable storage medium, having a computer program stored thereon. The computer program, when executed by a processor, causes the processor to perform the method of nidus segmentation of the first aspect.

On the basis of conforming to the general knowledge in the art, the above alternative conditions may be arbitrarily combined to obtain the preferred embodiments of the present disclosure.

BRIEF DESCRIPTION OF THE DRAWINGS

FIG. 1 is a flow chart of a method of nidus segmentation according to an embodiment of the present disclosure.

FIG. 2 is a schematic diagram showing a first vessel segmentation result according to an embodiment of the present disclosure.

FIG. 9 is a flow chart of another method of nidus segmentation according to an embodiment of the present disclosure.

DETAILED DESCRIPTION OF THE EMBODIMENTS

Figure 3:
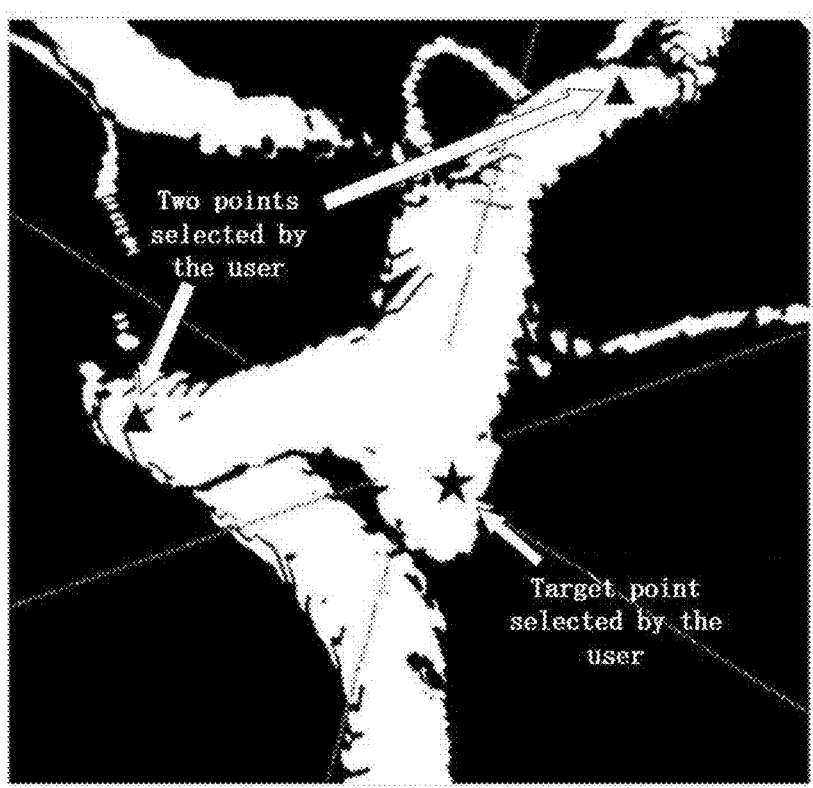
FIG. 3 is a schematic partial enlarged diagram of the first vessel segmentation result showing a nidus location and an object point according to an embodiment of the present disclosure.

The present disclosure is further illustrated by embodiments, but is not limited to the scope of the described embodiments.

The purpose of the present disclosure is to overcome the defect of low accuracy of segmentation of a nidus, which is in the vessel and has similar characteristics to those of the vessel in the prior art. The beneficial effects of the present disclosure are: on the basis of the first vessel segmentation result of the medical image to be processed, the first object medical image is obtained after straightening the first centerline of the first vessel of the medical image to be processed, and the first object vessel segmentation result is obtained after straightening the first centerline of the first vessel of the first vessel segmentation result, and the first object medical image and the first object vessel segmentation result are inputted into a nidus segmentation model for nidus segmentation, thereby realizing an accurate segmentation of the nidus having similar characteristics to those of the vessels. The present disclosure can not only reduce the proportion of false positive samples in the nidus segmentation results, but also can reduce an over-segmentation phenomenon of the nidus greatly, thereby contributing for improvement on segmentation details of a contact surface between the nidus and the vessel.

FIG. 1 is a schematic flowchart of a method of nidus segmentation according to an embodiment of the present disclosure. The method of nidus segmentation may be performed by an apparatus of nidus segmentation, which may be implemented by software and/or hardware, and the apparatus of nidus segmentation may be part or all of an electronic device. The electronic device of an embodiment may be a personal computer (PC) such as a desktop computer, an all-in-one computer, a notebook computer, or a tablet computer and so on, or may be a terminal device such as a mobile phone, a wearable device, or a personal digital assistant (PDA) and so on. The method of nidus segmentation provided in the present embodiment is described below by taking the electronic device as an executive subject.

As shown in FIG. 1, the method of nidus segmentation provided in this embodiment may include steps S1 to S5.

In step S1, a medical image to be processed is acquired.

The medical image to be processed is generally a three-dimensional image, and specifically, may be an image of CT Angiography (CTA), Magnetic Resonance Angiography (MRA), three-Dimensional Digital Subtraction Angiography (3D-DSA), or three-Dimensional Digital Radiography (3D-DR), etc., which may be obtained by scanning an object, or may be downloaded from a server or a network. The object may be a certain part of a patient, such as a head, an abdomen, a chest, etc.

In step S2, a vessel segmentation is performed on the medical image to be processed to obtain a first vessel segmentation result.

In specific embodiments, the vessel segmentation may be performed in different ways for different medical images to be processed. For example, for a medical image to be processed of the 3D-DSA, a threshold segmentation and a Hessian filter-based vessel enhancement algorithm may be used to acquire the first vessel segmentation result. In some scenarios, the first vessel segmentation result may also be referred to as a first vessel mask. Specifically, in the first vessel mask, a value of a voxel belonging to the vessel region is 1, and a value of a voxel not belonging to the vessel region is 0.

FIG. 2 is a schematic diagram showing a first vessel segmentation result. As shown in FIG. 2, the white solid lines in the figure represent vessels.

In step S3, a first centerline of the first vessel is extracted according to the first vessel segmentation result.

In a specific embodiment of step S3, the first centerline of the vessel may be extracted based on a model such as a neural network model.

In order to improve the overall segmentation effect of the nidus, the first centerline of the vessel can be extracted from the first vessel segmentation result by referring to points selected by the user according to the location of the nidus. In an alternative embodiment of step S3, at least two points are selected in the first vessel segmentation result, and the first centerline of the first vessel is extracted according to positions of the at least two points. The more the number of selected points, the more accurate the extracted first centerline of the first vessel.

In a specific embodiment, at least two points may be selected based on the location of the nidus believed by the user, such as a doctor, and the at least two selected points need to cover the proximal and distal ends of the nidus. The proximal end of the nidus refers to the end of the vessel segment proximate to the heart, while the distal end of the nidus refers to the end of the vessel segment away from the heart. That is, according to the location of the nidus believed by the user, the first vessel segmentation result of the branch vessel in which the nidus is located is refined to obtain the first centerline of the branch vessel in which the nidus is located.

Figure 4:
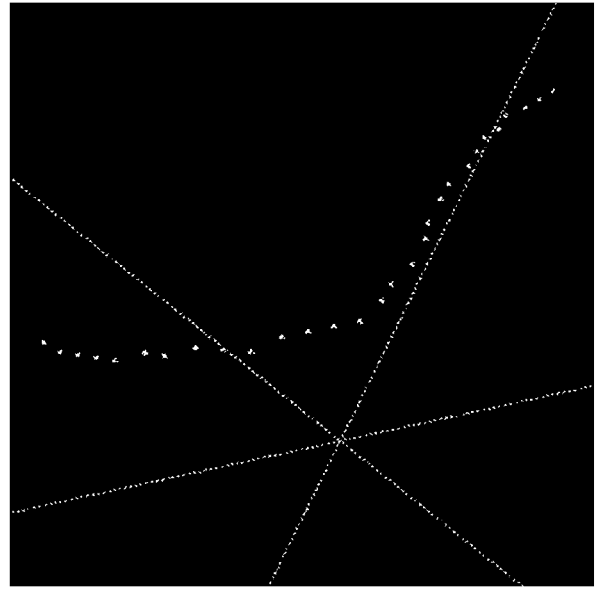
FIG. 4 is a schematic diagram showing an extracted centerline of a vessel according to an embodiment of the present disclosure.

In some embodiments, the method of nidus segmentation further includes selecting one point at each of positions covering a proximal end and a distal end of a nidus as believed, and extracting a centerline of a branch vessel in which the nidus is located according to two selected points. In the example shown in FIG. 3, the user may select the object points in the first vessel segmentation result according to the location of the nidus as believed by the user, and selects one point at each of the positions covering the proximal end and the distal end of the nidus. The first centerline of the first vessel is extracted according to the two points selected by the user, and the extracted first centerline is shown by the curve segment of the dotted line in FIG. 4.

In step S4, the medical image is cut for several times to obtain a plurality of first sections, and a first object medical image is further obtained by synthesizing the plurality of first sections, and the first vessel segmentation result is cut for several times to obtain a plurality of second sections, and a first object vessel segmentation result is obtained by synthesizing the plurality of second sections.

In a specific embodiment, one first section may be obtained by cutting the medical image to be processed once. The first section is substantially a two-dimensional image, a plurality of two-dimensional images may be obtained by cutting the medical image to be processed for several times, and a three-dimensional first object medical image may be obtained by synthesizing the plurality of two-dimensional images. In some scenarios, the first object medical image may also be referred to as an image obtained by straightening the first centerline of the vessel of medical image to be processed. In some embodiments, the first section may be obtained by cutting the medical image to be processed once along a direction perpendicular to the first centerline.

In a specific embodiment, one second section may be obtained by cutting the first vessel segmentation result once. The second section is substantially a two-dimensional image, a plurality of two-dimensional images may be obtained by cutting the first vessel segmentation result for several times, and a three-dimensional first object vessel segmentation result may be obtained by synthesizing the plurality of two-dimensional images. In some scenarios, the first object vessel segmentation result may also be referred to as an image obtained by straightening the first centerline of the vessel of the first vessel segmentation result, and may also be referred to as an object vessel mask. In some embodiments, the second section may be obtained by cutting the first vessel segmentation result once along a direction perpendicular to the first centerline.

Figure 5:
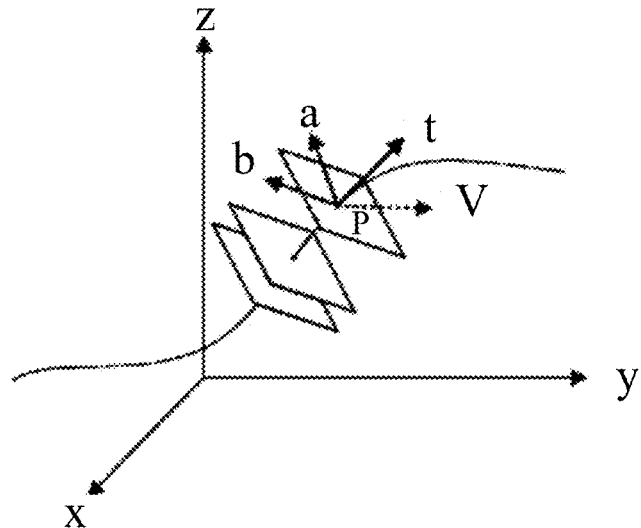
FIG. 5 is a schematic diagram showing a plurality of first sections cut off along directions perpendicular to the first centerline according to an embodiment of the present disclosure.
Figure 6:
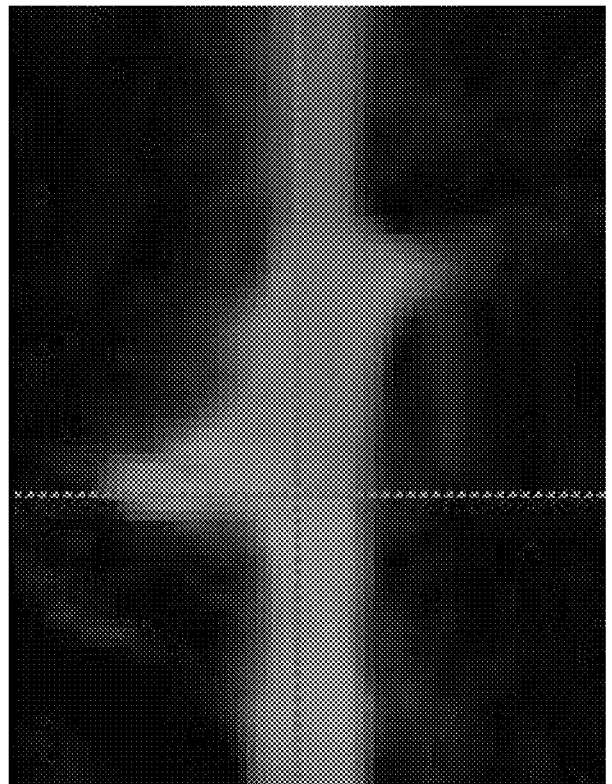
FIG. 6 is a schematic diagram showing a first object vessel segmentation result according to an embodiment of the present disclosure.

FIG. 5 is a schematic diagram showing a plurality of first sections cut off along directions perpendicular to the first centerline. FIG. 6 is a schematic diagram showing a first object vessel segmentation result. In a specific example, as shown in FIG. 5, the plurality of first sections are obtained by cutting the medical image to be processed for several times along the directions perpendicular to the first centerline, so as to further obtain the first object medical image. The first vessel segmentation result is cut for several times to obtain the plurality of second sections, and further obtain the first object vessel segmentation result shown in FIG. 6.

In a specific embodiment of step S4, the medical image to be processed is cut for several times along the directions perpendicular to the first centerline by a first step length to obtain the plurality of first sections. The first step length may be set according to actual conditions, for example, the first step length may be set to be 0.25 mm. That is, the medical image to be processed is cut along the direction perpendicular to the first centerline once at an interval of 0.25 mm to obtain one first section.

In a specific embodiment of step S4, the first vessel segmentation result is cut for several times along directions perpendicular to the first centerline by a second step length to obtain the plurality of second sections. The second step length may be set according to actual conditions. The second step length may be set to be the same as the first step length and is 0.25 mm, or may be set to be different from the first step length.

In step S5, a nidus segmentation result is obtained based on the first object medical image and the first object vessel segmentation result.

In some embodiments, the step S5 specifically includes inputting the first object medical image and the first object vessel segmentation result into a nidus segmentation model to perform a nidus segmentation, and obtaining a nidus segmentation result.

In an embodiment, the step S5 includes step S51 and step S52.

In step S51, in response to an object point selected in the first vessel segmentation result, image blocks of a predetermined size centered on the object point are cut from the first object medical image and the first object vessel segmentation result, respectively.

In step S52, the two extracted image blocks are inputted into the nidus segmentation model.

Figure 7:
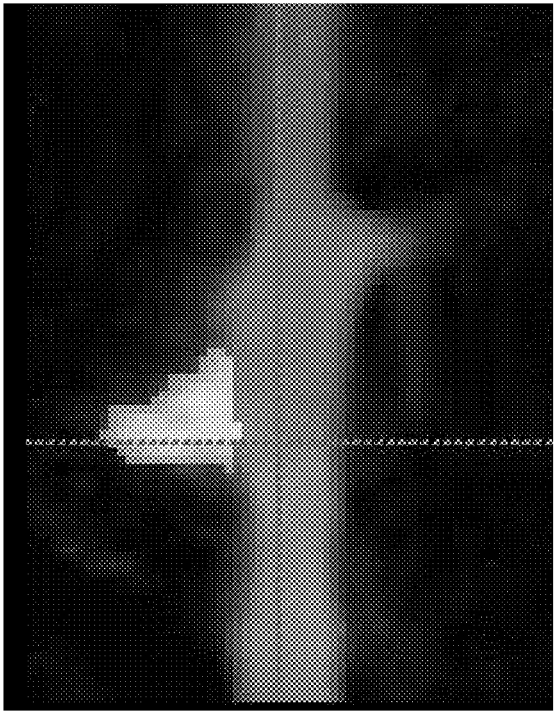
FIG. 7 is a schematic diagram showing a nidus segmentation result according to an embodiment of the present disclosure.

In this embodiment, the object point may be selected based on a position of the nidus as believed by a user, for example, a doctor. A first image block of the predetermined size centered on the object point may be extracted from the first object medical image, and a second image block of the predetermined size centered on the object point may be extracted from the first object vessel segmentation result. Finally, the first image block and the second image block are inputted into the nidus segmentation model for nidus segmentation. In a specific example, the nidus segmentation result outputted from the nidus segmentation model is shown in FIG. 7.

The nidus segmentation model is trained according to sample data including sample medical images, second object medical images, second object vessel segmentation results corresponding to the second object medical images, and nidus labeling results obtained by labeling niduses in the second object vessel segmentation results. In a specific embodiment, the nidus segmentation model may be a three-dimensional convolutional neural network model, a three-dimensional Unet network model, a VNet network model, or the like.

Figure 8:
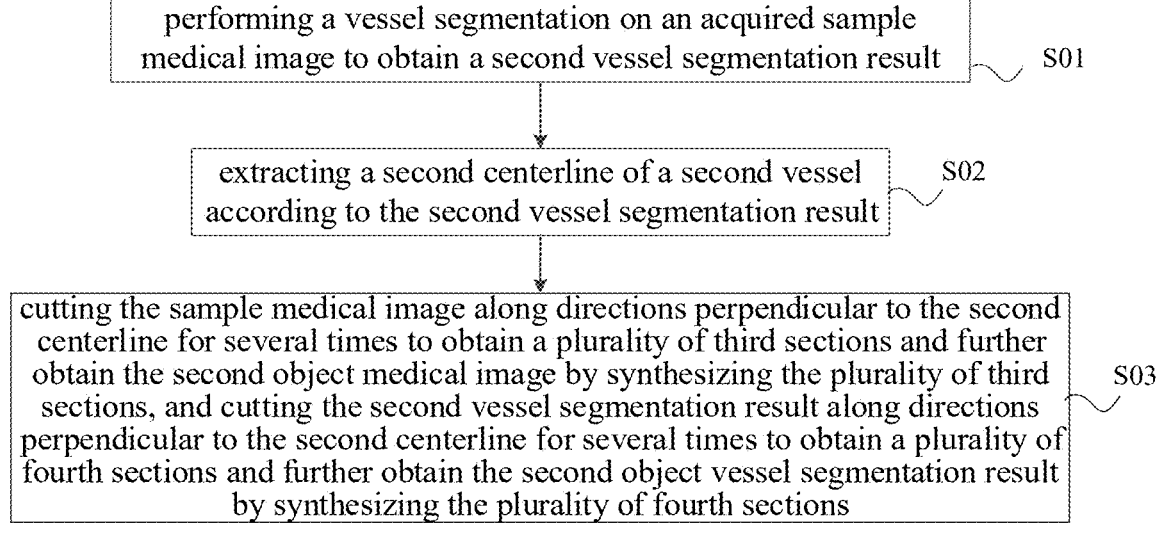
FIG. 8 is a flow chart of a method for acquiring a second object medical image and a second object vessel segmentation result according to an embodiment of the present disclosure.

As shown in FIG. 8, second object medical images and second object vessel segmentation results may be obtained according to the following steps S01 to step S03.

In step S01, a vessel segmentation is performed on an acquired sample medical image to obtain a second vessel segmentation result. The sample medical image is generally a three-dimensional image, and may be specifically an image of CTA, MRA, 3D-DSA, or 3D-DR, etc., which may be obtained by scanning different objects, or may be downloaded from the server or the network. The different objects may include the same parts of different patients, may include different parts of the same patient, and may also include different parts of different patients.

In step S02, a second centerline of a second vessel is extracted according to the second vessel segmentation result. The specific implementation of step S02 is similar to that of the above-described step S3. The second centerline of the second vessel may be extracted in combination with points selected from the second vessel segmentation result by the user according to the location of the nidus. Specifically, in response to at least two points selected in the second vessel segmentation result, the second centerline of the second vessel is extracted according to positions of the at least two points. The at least two selected points need to cover the proximal and distal ends of the nidus.

In step S03, the sample medical image is cut along directions perpendicular to the second centerline for several times to obtained a plurality of third sections, and the second object medical image is obtained by synthesizing the plurality of third sections, and the second vessel segmentation result is cut along directions perpendicular to the second centerline for several times to obtain a plurality of fourth sections, and the second object vessel segmentation result is obtained by synthesizing the plurality of fourth sections.

In a specific embodiment, one third section may be obtained by cutting the sample medical image once along a direction perpendicular to the second centerline. The third section is substantially a two-dimensional image, a plurality of two-dimensional images may be obtained by cutting the sample medical image for several times, and a three-dimensional second object medical image may be obtained by synthesizing the plurality of two-dimensional images. In some scenarios, the second object medical image may also be referred to as an image obtained by straightening the second centerline of the second vessel of the sample medical image.

In a specific implementation, one fourth section may be obtained by cutting the second vessel segmentation result once along a direction perpendicular to the second centerline. The fourth section is substantially a two-dimensional image, and a plurality of two-dimensional images may be obtained by cutting the second vessel segmentation result for several times, and a three-dimensional second object vessel segmentation result may be obtained by synthesizing the plurality of two-dimensional images. In some scenarios, the second object vessel segmentation result may also be referred to as an image obtained by straightening the second centerline of the second vessel of the second vessel segmentation result, and may also be referred to as a sample vessel mask.

Then, the nidus segmentation model is trained by using the second object medical image, the second object vessel segmentation result, and a nidus labeling result obtained by labeling a nidus in the second object vessel segmentation result. Specifically, the second object medical image and the second object vessel segmentation result are inputted into the nidus segmentation model to perform the nidus segmentation to obtain a predicted nidus segmentation result. A loss function is used to calculate a loss according to the predicted nidus segmentation result and the nidus labeling result, and it is judged whether a convergence condition is satisfied according to the loss. For example, if the loss is less than a preset value, the convergence condition is satisfied; and if the loss is greater than or equal to the preset value, the convergence condition is not satisfied. If the convergence condition is not satisfied, parameters of the nidus segmentation model are adjusted according to the loss, and by returning to step S01, a new sample medical image is acquired to train the nidus segmentation model. If the convergence condition is satisfied, it indicates that the nidus segmentation model has been trained properly, and the trained nidus segmentation model is outputted.

Different sample medical images may have different sizes, and the sizes of the second object medical images and the sizes of the second object vessel segmentation results obtained on the basis of different sample medical images may be different. To improve the training efficiency of the nidus segmentation model, the sizes of the second object medical images and the sizes of the second vessel segmentation results may be unified before the second object medical images and the second object vessel segmentation results are inputted to the nidus segmentation model. Taking the nidus labeled in the second vessel segmentation result as a center, image blocks of a predetermined size are extracted from the sample medical image and the second vessel segmentation result, respectively.

If the sizes of the second object medical images and the sizes of the second object vessel segmentation results corresponding to the different sample medical images are unified to be the preset size during the training of the nidus segmentation model, in order to improve the accuracy of the nidus segmentation obtained by the nidus segmentation model, it is also necessary to adjust the size of the first object medical image and the size of the first object vessel segmentation result to be the same preset size in a specific implementation of step S5. The specific value of the preset size may be set according to actual conditions. For example, the preset size may be set to be 64 mm×64 mm×64 mm.

It should be noted that data augmentation, such as a random rotation, may be performed for the second object medical image and the second object vessel segmentation result to augment the sample data for training the nidus segmentation model. Therefore, when the convergence condition is not satisfied, returning to step S01 to acquire a new sample image is unnecessary after adjusting the parameters of the model, and the nidus segmentation model may be directly trained by using the sample data obtained by the data augmentation, thereby improving the training efficiency.

According to the method of nidus segmentation provided in the embodiments of the present disclosure, on the basis of the first vessel segmentation result of the medical image to be processed, the first object medical image is obtained by straightening the first centerline of the first vessel of the medical image to be processed, and the first object vessel segmentation result is obtained by straightening the first centerline of the first vessel of the first vessel segmentation result. The first object medical image and the first object vessel segmentation result are inputted into the nidus segmentation model for processing, thereby realizing an accurate segmentation of a nidus having similar characteristics to those of the vessels. The method can not only reduce the proportion of false positive samples in the nidus segmentation results, but also can reduce the over-segmentation phenomenon of the nidus greatly, thereby contributing for improvement on segmentation details of a contact surface between the nidus and the vessel.

There are many niduses having similar characteristics to those of the vessels, such as an aneurysm, a venous aneurysm, a plaque, etc. In a specific example, the above-mentioned nidus is an intracranial aneurysm, and the segmentation of the intracranial aneurysm may be accurately performed by using the method of nidus segmentation provided in the present embodiment, and the segmentation details of the neck portion of the aneurysm may also be improved.

In an alternative embodiment, as shown in FIG. 9, the step S5 is followed by a step S6, in which the nidus segmentation result is combined with the first vessel segmentation result to obtain a final nidus segmentation result. In a specific embodiment, the nidus segmentation result may be filtered, etc., and then restored to the first vessel segmentation result. In a specific example, the above filtering processing may be used to filter the noise with small volume in the nidus segmentation result.

In the present embodiment, the nidus segmentation result outputted by the nidus segmentation model is obtained based on the images obtained by straightening the first centerline of the first vessel of the medical image to be processed and by straightening the first centerline of the first vessel of the first vessel segmentation result. In order to facilitate the diagnosis of the nidus at the actual position by the doctor, the nidus segmentation result is restored to the original first vessel segmentation result, thereby better assisting the medical diagnosis.

The present disclosure further provides a system of nidus segmentation, including: at least one non-transitory storage medium comprising a set of instructions for a nidus segmentation, and at least one processor in communication with the at least one non-transitory storage medium, wherein when executing the set of instructions, the at least one processor is configured to cause the system to perform operations including: acquiring a medical image to be processed; performing a vessel segmentation on the medical image to be processed to obtain a first vessel segmentation result; extracting a first centerline of the first vessel according to the first vessel segmentation result; cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and obtaining a nidus segmentation result based on the first object medical image and the first object vessel segmentation result.

In some embodiment, the cutting the medical image to be processed for several times includes cutting the medical image to be processed along directions perpendicular to the first centerline for several times, and the cutting the first vessel segmentation result for several times comprises cutting the first vessel segmentation result along the directions perpendicular to the first centerline for several times.

In some embodiments, the obtaining the nidus segmentation result based on the first object medical image and the first object vessel segmentation result includes: inputting first object medical image and the first object vessel segmentation result into a nidus segmentation model to perform the nidus segmentation, and obtaining the nidus segmentation result.

In some embodiments, the at least one processor is configured to cause the system to perform operations further comprising combining the nidus segmentation result with the first vessel segmentation result to obtain a final nidus segmentation result.

In some embodiments, the extracting the first centerline of the first vessel according to the first vessel segmentation result comprises extracting the first centerline of the first vessel according to positions of at least two points in response to the at least two points selected in the first vessel segmentation result.

Figure 10:
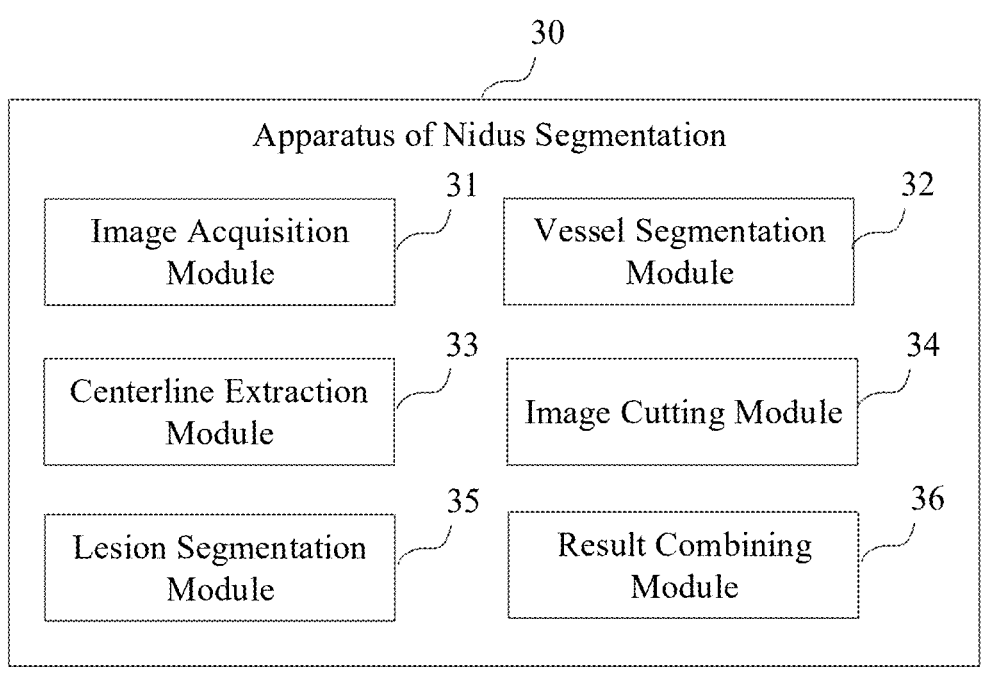
FIG. 10 is a structural block diagram of an apparatus of nidus segmentation according to an embodiment of the present disclosure.

As shown in FIG. 10, an embodiment of the present disclosure further provides an apparatus of nidus segmentation 30, including an image acquisition module 31, a vessel segmentation module 32, a centerline extraction module 33, an image cutting module 34, a nidus segmentation module 35, and a result combining module 36.

The image acquisition module 31 is configured to acquire a medical image to be processed. The vessel segmentation module 32 is configured to perform a vessel segmentation on the medical image to be processed to obtain a first vessel segmentation result. The centerline extraction module 33 is configured to extract a first centerline of the first vessel according to the first vessel segmentation result. The image cutting module 34 is configured to cut the medical image to be processed for several times to obtain a plurality of first sections, and to obtain a first object medical image by synthesizing the plurality of first sections, and configured to cut the first vessel segmentation result for several times to obtain a plurality of second sections, and to obtain a first object vessel segmentation result by synthesizing the plurality of second sections. The nidus segmentation module 35 is configured to input the first object medical image and the first object vessel segmentation result into a nidus segmentation model to perform a nidus segmentation, so as to obtain a nidus segmentation result. The result combining module 36 is configured to combine the nidus segmentation result with the first vessel segmentation result to obtain a final nidus segmentation result.

In some embodiments, the image cutting module is specifically configured to cut the medical image to be processed along directions perpendicular to the first centerline for several times to obtain the plurality of first sections, and configured to cut the first vessel segmentation result along the directions perpendicular to the first centerline for several times to obtain the plurality of second sections.

In an embodiment, the centerline extraction module is specifically configured to extract the first centerline of the first vessel according to positions of at least two points in response to the at least two points selected in the first vessel segmentation result.

In an embodiment, the image cutting module is specifically configured to cut the medical image to be processed for several times along directions perpendicular to the first centerline by a first step length to obtain the plurality of first sections.

In an embodiment, the image cutting module is specifically configured to cut the first vessel segmentation result for several times along directions perpendicular to the first centerline by a second step length to obtain the plurality of second sections.

In an embodiment, the nidus segmentation module is specifically configured to, in response to a selected object point in the first vessel segmentation result, extract image blocks of a predetermined size centered on the selected object point from the first object medical image and the first object vessel segmentation result, respectively, and input the two extracted image blocks into the nidus segmentation model.

In an embodiment, the nidus segmentation model is trained according to sample data including sample medical images, second object medical images, second object vessel segmentation results corresponding to the second object medical images, and nidus labeling results obtained by labeling the niduses in the second object vessel segmentation results.

In an embodiment, the apparatus of nidus segmentation further includes a sample acquisition module including a vessel segmentation unit, a centerline extraction unit, and an image cutting unit. The vessel segmentation unit is configured to perform a vessel segmentation on an acquired sample medical image to obtain a second vessel segmentation result. The centerline extraction unit is configured to extract a second centerline of a second vessel according to the second vessel segmentation result. The image cutting unit is configured to cut the sample medical image along directions perpendicular to the second centerline for several times to obtain a plurality of third sections and further obtain the second object medical image by synthesizing the plurality of third sections, and configured to cut the second vessel segmentation result along directions perpendicular to the second centerline for several times to obtain a plurality of fourth sections and further obtain the second object vessel segmentation result by synthesizing the plurality of fourth sections.

It should be noted that the apparatus of nidus segmentation in this embodiment may be specifically a separate chip, a chip module, or an electronic device, or may be a chip or a chip module integrated in the electronic device.

The various modules/units included in the apparatus of nidus segmentation described in the embodiments of the present disclosure may be software modules/units, may be hardware modules/units, or may be partially software modules/units and partially hardware modules/units.

Figure 11:
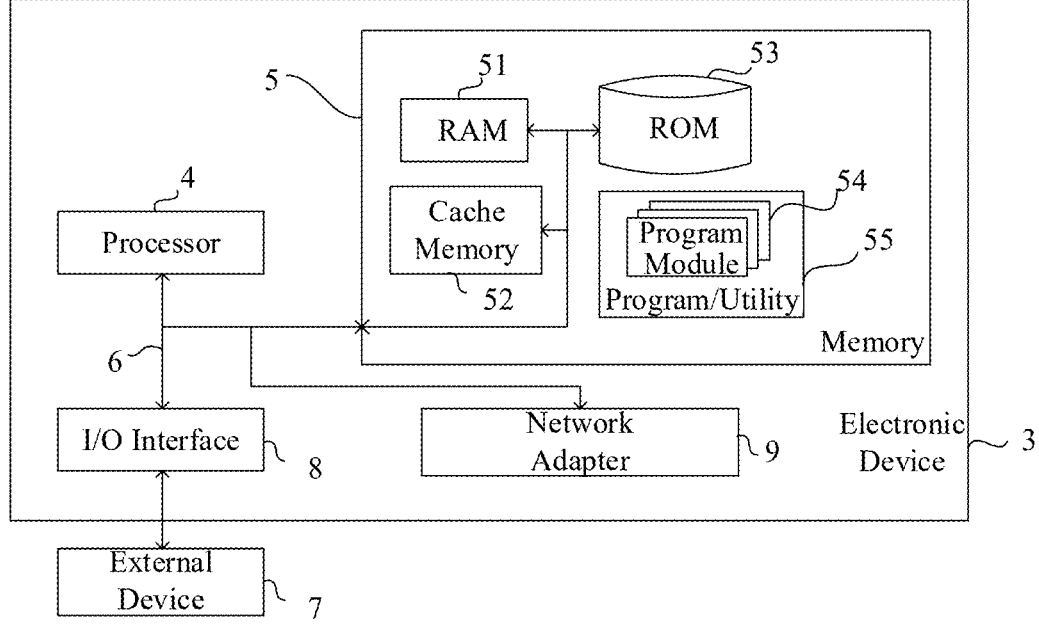
FIG. 11 is a schematic view showing a structure of an electronic device according to an embodiment of the present disclosure.

FIG. 11 is a schematic view showing a structure of an electronic device according to an embodiment of the present disclosure. The electronic device includes at least one processor, and a memory in communication with the at least one processor. The memory stores a computer program executable by the at least one processor. When executed by the at least one processor, the computer program causes the at least one processor to perform the method of nidus segmentation of the above embodiments of the present disclosure. The electronic device provided in this embodiment may be a personal computer, such as a desktop computer, an all-in-one computer, a notebook computer, a tablet computer and so on, or a terminal device such as a mobile phone, a wearable device, or a personal digital assistant and so on. The electronic device 3 shown in FIG. 11 is merely an example and should not limit the functionality and scope of application of the embodiments of the present disclosure.

The components of the electronic device 3 may include, but are not limited to, the at least one processor 4, the at least one memory 5, and a bus 6 connecting different system components including the memory 5 and the processor 4.

The bus 6 includes a data bus, an address bus, and a control bus.

The memory 5 may include a volatile memory, such as a random access memory (RAM) 51 and/or a cache memory 52, and may further include a read only memory (ROM) 53.

The memory 5 may also include a program/utility software 55 having a set of (at least one) program module(s) 54. The program module 54 includes, but not limited to, an operating system, one or more application programs, other program modules, and program data. Each of the examples or some combination of these examples may include an implementation of a network environment.

When running the computer program stored in the memory 5, the processor 4 performs various functional applications and a data processing, such as the method of nidus segmentation of an embodiment described above.

The electronic device 3 may also communicate with one or more external devices 7 (e.g., a keyboard, a pointing device, etc.). Such communication may be realized through an input/output (I/O) interface 8. Also, the electronic device 3 may also communicate with one or more networks, such as a local area network (LAN), a wide area network (WAN), and/or a public network (e.g., the Internet), through a network adapter 9. As shown in FIG. 11, the network adapter 9 communicates with other modules of the electronic device 3 via the bus 6. It should be understood that, although not shown in FIG. 11, other hardware and/or software modules including, but not limited to, a microcode, a device driver, a redundant processor, an external disk drive array, a system of redundant arrays of independent disks (RAID), a tape driver, and a data backup storage system, etc., may be used in conjunction with the electronic device 3.

It should be noted that although several units/modules or sub-units/modules of the electronic device are mentioned in the above detailed description, this division is merely exemplary and not mandatory. Indeed, according to the embodiments of the present disclosure, the features and functions of two or more units/modules described above may be specified in one unit/module. Conversely, the features and functions of one unit/module described above may be further divided and specified by a plurality of units/modules.

An embodiment of the present disclosure provides a non-transitory computer readable storage medium having a computer program stored thereon, which, when executed by a processor, causes the processor to perform the method of nidus segmentation of the embodiments above.

More specifically, the readable storage medium may include, but is not limited to, a portable disk, a hard disk, a random access memory, a read-only memory, a erasable programmable read-only memory, an optical memory device, a magnetic memory device, or any proper combination thereof.

In a possible embodiment, the present disclosure may also be implemented in the form of a program product including a program code. The program causes the electronic device to perform the method of nidus segmentation of the embodiments of the present disclosure when the program product is run on the electronic device.

The program code for implementing the present disclosure may be written with one programming language or any combination of more programming languages, and the program code may be executed entirely on the electronic device, executed partly on the electronic device, executed as a separate software package, executed partly on the electronic device and partly on a remote device, or executed entirely on the remote device.

Although specific embodiments of the present disclosure have been described above, it should be understood by those skilled in the art, that these embodiments are merely illustrative, and that the scope of the present disclosure is defined by the appended claims. Various changes or modifications may be made to these implementations by those skilled in the art without departing from the principles and essences of the disclosure, but these changes and modifications are within the scope of the disclosure.

What is claimed is:

1. A method of nidus segmentation, comprising:
acquiring a medical image to be processed;
performing a vessel segmentation on the medical image to be processed to obtain a first vessel segmentation result;
extracting a first centerline of a first vessel according to the first vessel segmentation result;
cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and
obtaining a nidus segmentation result based on the first object medical image and the first object vessel segmentation result.

2. The method of nidus segmentation according to claim 1, wherein the extracting the first centerline of the first vessel according to the first vessel segmentation result comprises:
extracting the first centerline of the first vessel according to positions of at least two points in response to the at least two points selected in the first vessel segmentation result.

3. The method of nidus segmentation according to claim 1, wherein the cutting the medical image to be processed for several times comprises cutting the medical image to be processed along directions perpendicular to the first centerline for several times; and
the cutting the first vessel segmentation result for several times comprises cutting the first vessel segmentation result along the directions perpendicular to the first centerline for several times.

4. The method of nidus segmentation according to claim 3, wherein the cutting the medical image to be processed along the directions perpendicular to the first centerline for several times to obtain the plurality of first sections comprises:

cutting the medical image to be processed for several times along the directions perpendicular to the first centerline by a first step length to obtain the plurality of first sections.

5. The method of nidus segmentation according to claim 3, wherein the cutting the first vessel segmentation result along the directions perpendicular to the first centerline for several times to obtain the plurality of second sections comprises:
cutting the first vessel segmentation result for several times along the directions perpendicular to the first centerline by a second step length to obtain the plurality of second sections.

6. The method of nidus segmentation according to claim 5, wherein the second step length is 0.25 mm.

7. The method of nidus segmentation according to claim 1, wherein the obtaining the nidus segmentation result based on the first object medical image and the first object vessel segmentation result comprises:
inputting the first object medical image and the first object vessel segmentation result into a nidus segmentation model to perform a nidus segmentation, and obtaining the nidus segmentation result.

8. The method of nidus segmentation according to claim 7, wherein the inputting the first object medical image and the first object vessel segmentation result into the nidus segmentation model comprises:
selecting an object point based on a position of nidus as believed;
extracting a first image block of a predetermined size centered on the object point from the first object medical image, and extracting a second image block of the predetermined size centered on the object point from the first object vessel segmentation result;
inputting the first image block and the second image block into the nidus segmentation model.

9. The method of nidus segmentation according to claim 7, wherein after the inputting the first object medical image and the first object vessel segmentation result into the nidus segmentation model to perform the nidus segmentation and obtaining the nidus segmentation result, the method further comprises:
combining the nidus segmentation result with the first vessel segmentation result to obtain a final nidus segmentation result.

10. The method of nidus segmentation according to claim 7, wherein the nidus segmentation model is trained according to sample data, and the sample data comprise sample medical images, second object medical images, second object vessel segmentation results corresponding to the second object medical images, and nidus labeling results obtained by labeling niduses in the second object vessel segmentation results.

11. The method of nidus segmentation according to claim 10, wherein obtaining the second object medical images and the second object vessel segmentation results comprises:
performing a vessel segmentation on an acquired sample medical image to obtain a second vessel segmentation result;
extracting a second centerline of a second vessel according to the second vessel segmentation result; and
cutting the sample medical image along directions perpendicular to the second centerline for several times to obtain a plurality of third sections and further obtain the second object medical image by synthesizing the plurality of third sections, and cutting the second vessel segmentation result along directions perpendicular to the second centerline for several times to obtain a plurality of fourth sections and further obtain the second object vessel segmentation result by synthesizing the plurality of fourth sections.

12. The method of nidus segmentation according to claim 1, wherein the medical image to be processed is a three-dimensional digital radiography image, and a threshold segmentation and a Hessian filter-based vessel enhancement algorithm are used to acquire the first vessel segmentation result.

13. The method of nidus segmentation according to claim 1, further comprising:

selecting one point at each of positions covering a proximal end and a distal end of a nidus as believed; and extracting a centerline of a branch vessel in which the nidus is located according to two selected points;

wherein the proximal end of the nidus is an end of a vessel segment proximate to a heart, and the distal end of the nidus is an end of the vessel segment away from the heart.

14. A electronic device, comprising a memory and a processor, wherein, a computer program is stored on the memory, and the processor, when executing the computer program, performs the method of claim 1.

15. A non-transitory computer readable storage medium, having a computer program stored thereon, wherein, the computer program, when executed by a processor, causes the processor to perform the method of claim 1.

16. A system of nidus segmentation, comprising:

at least one non-transitory storage medium comprising a set of instructions for a nidus segmentation; and at least one processor in communication with the at least one non-transitory storage medium, wherein when executing the set of instructions, the at least one processor is configured to cause the system to perform operations comprising:

acquiring a medical image to be processed;

performing a vessel segmentation on the medical image to be processed to obtain a first vessel segmentation result;

extracting a first centerline of the first vessel according to the first vessel segmentation result;

cutting the medical image to be processed for several times to obtain a plurality of first sections and further obtain a first object medical image by synthesizing the plurality of sections, and cutting the first vessel segmentation result for several times to obtain a plurality of second sections and further obtain a first object vessel segmentation result by synthesizing the plurality of second sections; and obtaining a nidus segmentation result based on the first object medical image and the first object vessel segmentation result.

17. The system of nidus segmentation according to claim 16, wherein:

the cutting the medical image to be processed for several times comprises cutting the medical image to be processed along directions perpendicular to the first centerline for several times; and the cutting the first vessel segmentation result for several times comprises cutting the first vessel segmentation result along the directions perpendicular to the first centerline for several times.

18. The system of nidus segmentation according to claim 16, the obtaining the nidus segmentation result based on the first object medical image and the first object vessel segmentation result comprises:

inputting the first object medical image and the first object vessel segmentation result into a nidus segmentation model to perform the nidus segmentation, and obtaining the nidus segmentation result.

19. The system of nidus segmentation according to claim 18, the at least one processor is configured to cause the system to perform operations further comprising combining the nidus segmentation result with the first vessel segmentation result to obtain a final nidus segmentation result.

20. The system of nidus segmentation according to claim 16, wherein the extracting the first centerline of the first vessel according to the first vessel segmentation result comprises extracting the first centerline of the first vessel according to positions of at least two points in response to the at least two points selected in the first vessel segmentation result.

* * * * *